(12) United States Patent
Testu et al.

(10) Patent No.: US 8,346,040 B2
(45) Date of Patent: Jan. 1, 2013

(54) BUFFERED OPTICAL FIBER

(75) Inventors: Jean-Marc Testu, Antibes Juan les Pins (FR); Olivier Tatat, Sangatte (FR)

(73) Assignee: Draka Comteq, B.V., Amsterdam (NL)

( * ) Notice: Subject to any disclaimer, the term of this patent is extended or adjusted under 35 U.S.C. 154(b) by 309 days.

(21) Appl. No.: 12/636,277

(22) Filed: Dec. 11, 2009

(65) Prior Publication Data

US 2010/0150505 A1   Jun. 17, 2010

(30) Foreign Application Priority Data

Dec. 12, 2008   (FR) ...................... 08 07021

(51) Int. Cl.
*G02B 6/44*   (2006.01)
(52) U.S. Cl. ........................ 385/103; 385/113
(58) Field of Classification Search ............. 385/103, 385/113
See application file for complete search history.

(56) References Cited

U.S. PATENT DOCUMENTS

| | | | |
|---|---|---|---|
| 4,557,560 A * | 12/1985 | Bohannon et al. ............. | 385/107 |
| 4,645,298 A * | 2/1987 | Gartside, III ................. | 385/106 |
| 4,822,134 A * | 4/1989 | Campbell ..................... | 385/109 |
| 4,838,643 A | 6/1989 | Hodges et al. | |
| 4,859,025 A * | 8/1989 | Houghton ..................... | 385/114 |
| 5,181,268 A | 1/1993 | Chien | |
| 5,408,564 A | 4/1995 | Mills | |
| 5,440,660 A | 8/1995 | Dombrowski et al. | |
| 5,574,816 A | 11/1996 | Yang et al. | |
| 5,604,833 A * | 2/1997 | Kambe et al. ................. | 385/104 |
| 5,673,352 A | 9/1997 | Bauer et al. | |
| 5,717,805 A | 2/1998 | Stulpin | |
| 5,761,362 A | 6/1998 | Yang et al. | |
| 5,911,023 A | 6/1999 | Risch et al. | |
| 5,982,968 A | 11/1999 | Stulpin | |
| 6,035,087 A | 3/2000 | Bonicel et al. | |
| 6,066,397 A | 5/2000 | Risch et al. | |
| 6,085,009 A | 7/2000 | Risch et al. | |
| 6,134,363 A | 10/2000 | Hinson et al. | |
| 6,175,677 B1 | 1/2001 | Yang et al. | |
| 6,181,857 B1 | 1/2001 | Emeterio et al. | |
| 6,210,802 B1 | 4/2001 | Risch et al. | |
| 6,215,931 B1 | 4/2001 | Risch et al. | |
| 6,314,224 B1 | 11/2001 | Stevens et al. | |
| 6,321,012 B1 | 11/2001 | Shen | |
| 6,321,014 B1 | 11/2001 | Overton et al. | |
| 6,334,016 B1 | 12/2001 | Greer, IV | |

(Continued)

FOREIGN PATENT DOCUMENTS

EP   0690033 A1   1/1996

(Continued)

OTHER PUBLICATIONS

French Search Report in counterpart French Application No. 0807021 dated Aug. 31, 2009, pp. 1-6.

(Continued)

*Primary Examiner* — Charlie Peng
(74) *Attorney, Agent, or Firm* — Summa, Additon & Ashe, P.A.

(57) ABSTRACT

A buffered optical fiber structure includes an optical fiber, a mechanical reinforcement member extending along the optical fiber, a protective sheath having a cavity containing the optical fiber and the mechanical reinforcement member, and an intermediate material contacting the protective sheath and surrounding the optical fiber and the mechanical reinforcement member.

22 Claims, 4 Drawing Sheets

U.S. PATENT DOCUMENTS

| | | |
|---|---|---|
| 6,381,390 B1 | 4/2002 | Hutton et al. |
| 6,493,491 B1 | 12/2002 | Shen et al. |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,749,446 B2 | 6/2004 | Nechitailo |
| 6,775,443 B2 | 8/2004 | Bringuier et al. |
| 6,912,347 B2 | 6/2005 | Rossi et al. |
| 6,922,515 B2 | 7/2005 | Nechitailo et al. |
| 6,931,190 B2 * | 8/2005 | Ino et al. ............ 385/128 |
| 6,941,049 B2 | 9/2005 | Risch et al. |
| 7,045,010 B2 | 5/2006 | Sturman, Jr. |
| 7,162,128 B2 | 1/2007 | Lovie et al. |
| 7,308,176 B2 * | 12/2007 | Bocanegra et al. ....... 385/103 |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,483,613 B2 | 1/2009 | Bigot-Astruc et al. |
| 7,515,795 B2 | 4/2009 | Overton et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,724,998 B2 | 5/2010 | Parris et al. |
| 7,817,891 B2 | 10/2010 | Lavenne et al. |
| 2002/0136513 A1 * | 9/2002 | Consonni et al. ........ 385/113 |
| 2003/0059181 A1 * | 3/2003 | Jackman et al. ......... 385/102 |
| 2003/0118296 A1 | 6/2003 | Smith |
| 2003/0185528 A1 * | 10/2003 | Bourget ............ 385/113 |
| 2006/0140559 A1 * | 6/2006 | Tsuda et al. ........... 385/123 |
| 2008/0292262 A1 | 11/2008 | Overton et al. |
| 2009/0175583 A1 | 7/2009 | Overton |
| 2009/0214167 A1 | 8/2009 | Lookadoo et al. |
| 2009/0252469 A1 | 10/2009 | Sillard et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0067855 A1 | 3/2010 | Barker |
| 2010/0067857 A1 | 3/2010 | Lovie et al. |
| 2010/0092135 A1 | 4/2010 | Barker et al. |
| 2010/0092138 A1 | 4/2010 | Overton |
| 2010/0092139 A1 | 4/2010 | Overton |
| 2010/0092140 A1 | 4/2010 | Overton |
| 2010/0118388 A1 | 5/2010 | Pastouret et al. |
| 2010/0119202 A1 | 5/2010 | Overton |
| 2010/0135623 A1 | 6/2010 | Overton |
| 2010/0135624 A1 | 6/2010 | Overton et al. |
| 2010/0135625 A1 | 6/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2011/0044595 A1 | 2/2011 | Sillard et al. |

FOREIGN PATENT DOCUMENTS

| | | |
|---|---|---|
| EP | 0784220 A1 | 7/1997 |
| EP | 1324091 A2 | 7/2003 |
| EP | 1921478 A1 | 5/2008 |
| EP | 2196834 A1 | 6/2010 |
| GB | 2096343 A | 10/1982 |
| GB | 2107326 * | 4/1983 |
| WO | 00/60393 A1 | 10/2000 |
| WO | 2009/062131 A1 | 5/2009 |

OTHER PUBLICATIONS

European Search Report and Written Opinion in counterpart European Application No. 09015297 dated Mar. 19, 2010, pp. 1-6.
Chinese Office Action in counterpart Chinese Application No. 200910250528.3 dated Jul. 3, 2012, pp. 1-7.
English translation of Chinese Office Action in counterpart Chinese Application No. 200910250528.3 dated Jul. 3, 2012, pp. 1-9.

* cited by examiner

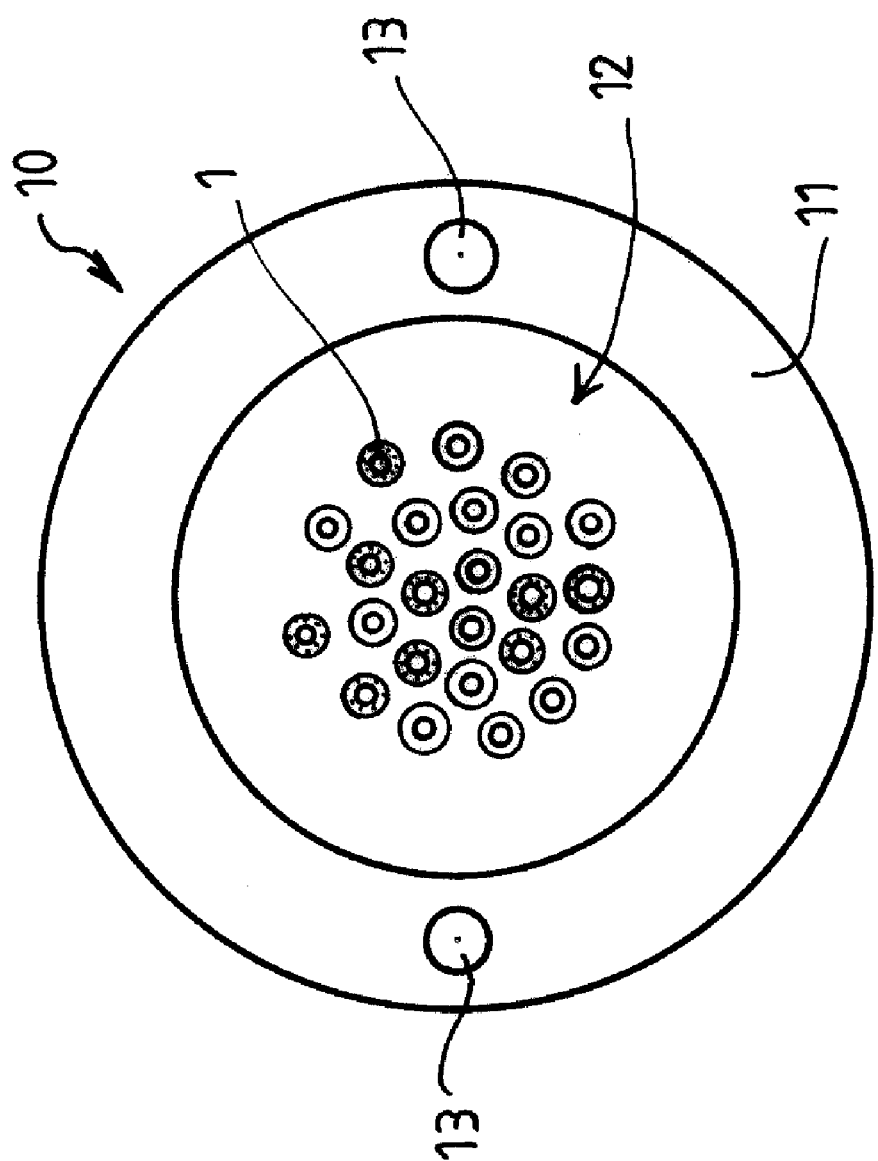

BUFFERED OPTICAL FIBER

CROSS-REFERENCE TO PRIORITY APPLICATION

This application claims the benefit of pending French Application No. 08/07021 for "Fibre optique gainee, cable de telecommunication comportant plusieurs fibres optiques et procede de fabrication dune telle fibre" (filed Dec. 12, 2008, at the French Patent Office), which is hereby incorporated by reference in its entirety.

FIELD OF THE INVENTION

The invention relates to optical fiber telecommunications cables. More precisely, the invention relates to telecommunications cables that contain buffered optical fibers that are extracted over considerable lengths.

BACKGROUND

Typically, buffered optical fibers are used for outdoor telecommunications networks. To allow the optical-fiber cable to feed different buildings, the buffered optical fibers of the cable need to be accessible. To access the optical fibers, an operator makes an opening in the cable to extract one or more buffered optical fibers, which are then directed toward the building that is to be served.

Typically, optical fibers have a standard diameter of about 250 microns (μm). The diameter of the optical fiber typically includes an optical-fiber core, a cladding surrounding the core, and a coating surrounding the cladding. The core of the optical fiber transmits an optical signal. The cladding confines the optical signal in the fiber core, and the coating protects the cladding.

When a protective sheath (e.g., a buffer or buffer material) is employed to surround the optical fiber, the resulting diameter of the optical fiber and protective sheath is about 900 microns. This protective sheath provides sealing and protection against impacts and facilitates handling of the fiber.

Buffered optical fibers are typically positioned loosely within a cable, so that it is easy for an operator to extract one or more optical fibers from the cable. Buffered optical fibers used in outdoor telecommunications networks are generally either tightly buffered within a protective sheath (i.e., a tight-buffered fiber) or semi-tightly buffered (i.e., a semi-tight buffered fiber) within a protective sheath.

Tight-buffered fibers are robust and typically remain stable over the usual utilization temperature range (e.g., about −40° C. to +70° C.). Tight-buffered fibers, however, present some drawbacks. In particular, after extracting a tight-buffered optical fiber from the cable, the operator typically also removes the optical fiber (i.e., the fiber core, the cladding, and the coating) from the protective sheath.

Typically, only a few centimeters of the optical fiber can be removed from the protective sheath, because the bonding between the optical fiber and the protective sheath is strong. In this regard, separating more than a few centimeters of the optical fiber from its protective sheath typically tears the coating of the optical fiber away from the cladding.

To alleviate the drawbacks of tight-buffered fibers, semi-tight buffered fibers have been proposed. In a typical semi-tight structure, the optical fiber and the protective sheath of the fiber are not in direct contact but are decoupled. In this regard, there is a gap between the optical fiber and its protective sheath.

As a result, for semi-tight buffered fibers, much greater lengths of optical fiber can be removed from the protective sheath than with a cable having tight-buffered optical fibers. Typically, a few meters of optical fiber can be removed from the protective sheath.

Nevertheless, decoupling the optical fiber and its protective sheath has drawbacks. When an operator extracts a semi-tight buffered fiber from the cable, the extraction force is applied to the protective sheath, which can then slide relative to the optical fiber. Such sliding can give rise to an offset between the length of the optical fiber and the length of the protective sheath. This offset can lead to attenuation in the signal transported by the optical fiber core.

The previously discussed problems are not limited to buffered optical fibers employed in outdoor telecommunications networks and can be encountered whenever a buffered optical fiber is extracted from a cable.

One solution to the attenuation problem that can be caused by the gap between the optical fiber and the protective sheath (e.g., attenuation caused by the sliding of the optical fiber within the protective sheath) includes placing an intermediate layer between the optical fiber and the protective sheath.

For example, U.S. Pat. No. 5,181,268, which is hereby incorporated by reference, proposes an intermediate layer of a lubricant (e.g., polytetrafluoroethylene, such as TEFLON®) and a solid binder (e.g., an acrylic polymer).

European Patent No. 0690033, (and its counterpart U.S. Pat. No. 5,408,564) which is hereby incorporated by reference, proposes a cross-linked intermediate layer including an ultra-high molecular weight polyethylene (UHMWPE) or TEFLON® mixed with a photo-curable binder such as a urethane polymer.

U.S. Pat. No. 6,775,443, which is hereby incorporated by reference, proposes a cross-linked intermediate layer including a matrix of urethane acrylate including oligomers, monomers, a photoinitiator, and an antioxidant combined with a liquid release reagent (e.g., liquid silicone).

Nevertheless, using polytetrafluoroethylene (e.g., TEFLON®) in the buffered optical fibers is not compatible with existing standards. TEFLON® includes fluorine and, as such, is not suitable for cabling a building. Furthermore, the use of curable materials requires additional manufacturing steps (e.g., passing the buffered optical fiber under an ultraviolet (UV) lamp).

Buffered optical fibers may include a mechanical reinforcement to increase the longitudinal strength of the buffered optical fiber. For example, U.K. Patent Application Publication No. GB 2,096,343, which is hereby incorporated by reference, discloses a buffered optical fiber of semi-tight structure (i.e., a semi-tight buffered fiber) that includes aramid strands placed along the axis of the buffered optical fiber in the gap between the optical fiber and the protective sheath. The aramid strands, however, do not couple the optical fiber and its protective sheath.

In view of the foregoing, there is a need for a buffered optical fiber structure that protects the optical fiber contained therein and facilitates the removal of optical fibers from the buffered optical fiber structure.

SUMMARY

Accordingly, in one aspect the present invention embraces a buffered optical fiber structure that includes an optical fiber, a mechanical reinforcement member extending along the optical fiber, an intermediate material surrounding the optical fiber and the mechanical reinforcement member, and a protective sheath surrounding the intermediate material. In some exemplary embodiments, the buffered optical fiber structure includes more than one optical fiber. The buffered optical fiber structure may also include more than one mechanical reinforcement member.

Optical fibers included in the buffered optical fiber structure of the present invention typically include a fiber core, a cladding surrounding the fiber core, and a coating surrounding the cladding.

In some exemplary embodiments, the buffered optical fiber structure includes two mechanical reinforcement members and one optical fiber. In one exemplary embodiment, the mechanical reinforcement member is made of aramid.

In an exemplary embodiment, the optical fiber deforms with maximum elongation of 0.5 percent when it is subjected to an extraction force of about 25 newtons (N).

In some exemplary embodiments, the intermediate material is a thermoplastic material. In an exemplary embodiment, the intermediate material is a hot-melt material. In one exemplary embodiment, the intermediate material possesses a softening temperature higher than +70° C. In another exemplary embodiment, the intermediate material possesses a glass transition temperature lower than −40° C. In one exemplary embodiment, the intermediate material is a thermoplastic possessing the consistency of a flexible gel over a temperature range of about −40° C. to +70° C. In another exemplary embodiment, the intermediate material includes synthetic hydrocarbon polymers.

Typically, the protective sheath includes polybutylene terephthalate, nucleated polybutylene terephthalate, low-shrinkage polybutylene terephthalate, polyamide 12, amorphous polyamide 12, polyamide 11, polyvinyl chloride, nylon, polyethylene, a halogen-free flame retardant material, a urethane polymer, and/or polyester.

In an exemplary embodiment, the buffered optical fiber structure includes two or more optical fibers (e.g., between 3 and 10 optical fibers). In one exemplary embodiment, the buffered optical fiber includes more than twenty optical fibers (e.g., more than fifty optical fibers).

In another aspect, the invention embraces a telecommunications cable having a plurality of buffered optical fibers placed freely within an outer cable sheath.

In yet another aspect, the invention embraces a method of fabricating a buffered optical fiber structure. An exemplary method includes placing a mechanical reinforcement member along an optical fiber and extruding an intermediate material around the optical fiber and mechanical reinforcement member. Typically the method further includes extruding a protective sheath around the intermediate material. In one exemplary embodiment, the intermediate material and the protective sheath are extruded in a single operation (e.g., concurrently).

Typically, the method initially includes drawing an optical fiber preform to form a fiber core and cladding surrounding the core and applying a coating which surrounds the cladding.

In one exemplary embodiment, the intermediate material is extruded at a temperature of between about 130° C. to 160° C. (e.g., about 140° C.).

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 4 schematically depicts a cross-section of an exemplary cable having a plurality of buffered optical fibers according to the present invention.

DETAILED DESCRIPTION

Figure 1:
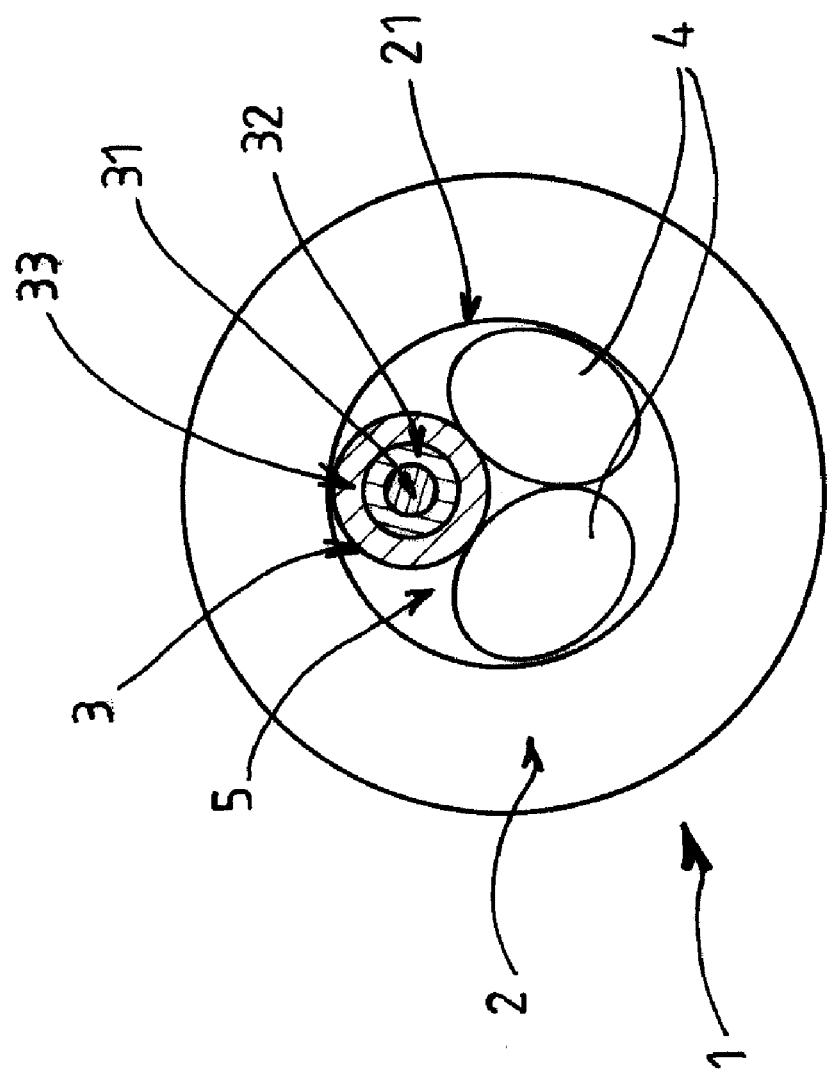
FIG. 1 schematically depicts a cross-section of an exemplary buffered optical fiber according to the present invention.
Figure 2:
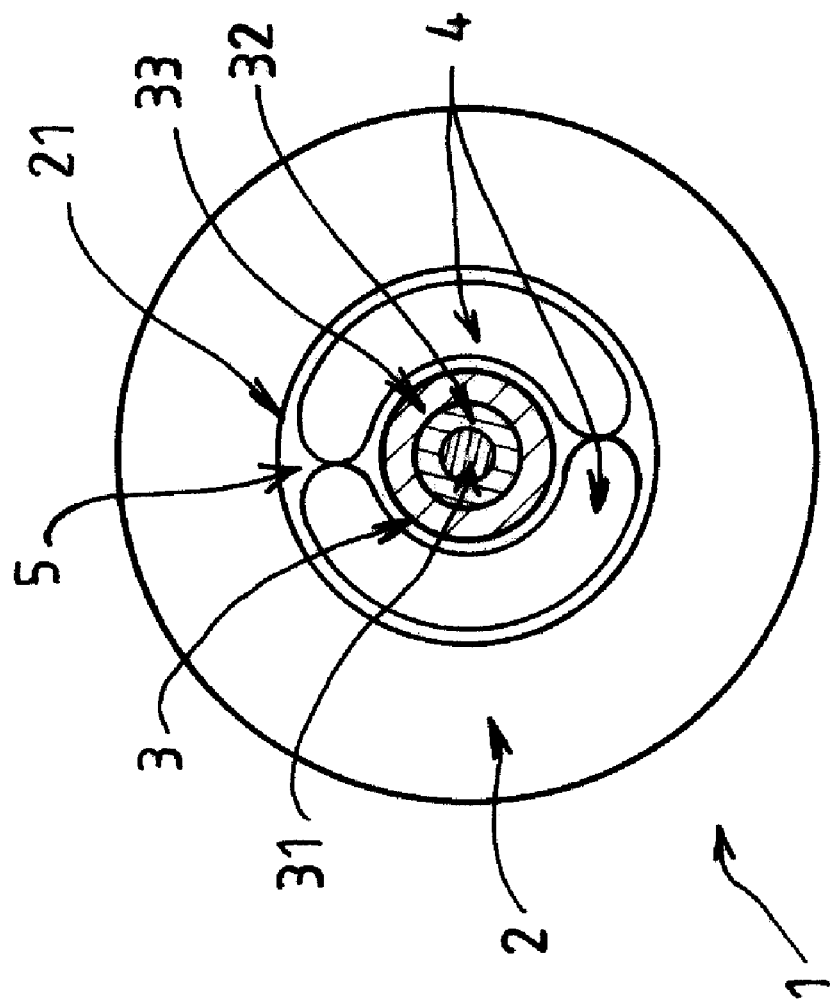
FIG. 2 schematically depicts a cross-section of another exemplary buffered optical fiber according to the present invention.
Figure 3:
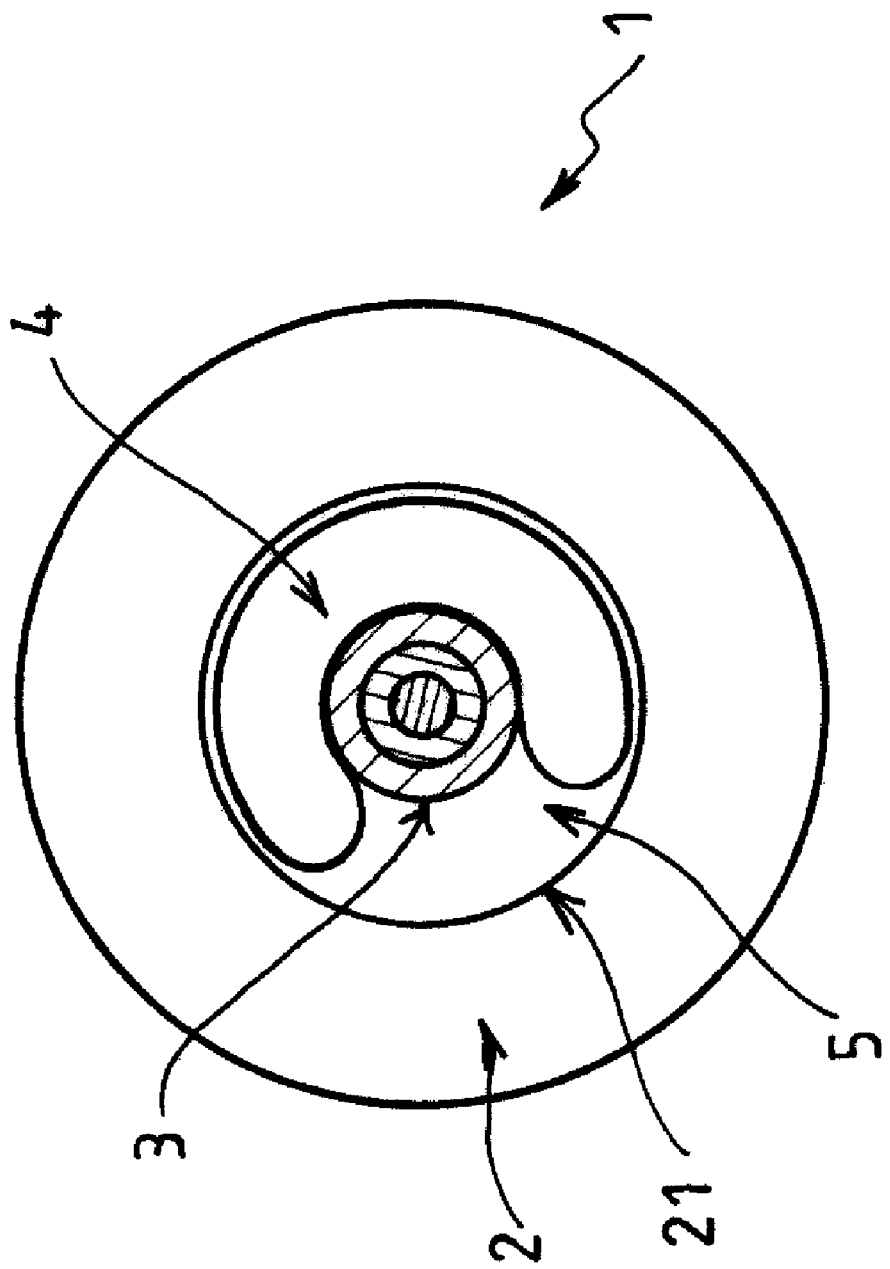
FIG. 3 schematically depicts a cross-section of another exemplary buffered optical fiber according to the present invention.

Exemplary embodiments of the buffered optical fiber structure (i.e., a buffered optical fiber or buffered optical fiber module) of the present invention are depicted in FIGS. 1-3.

Typically, the buffered optical fiber structure 1 includes a protective sheath 2 (e.g., a buffer) having a cavity 21 that extends longitudinally along the axis of the buffered optical fiber 1. In some exemplary embodiments, the cavity 21 is substantially cylindrical in shape.

The cavity 21 typically contains a plurality of elements that include an optical fiber 3, a mechanical reinforcement member 4 (e.g., a mechanical reinforcement strand) extending along the optical fiber 3, and an intermediate material 5 located between the protective sheath 2 and the assembly formed by the optical fiber 3 and the mechanical reinforcement member 4.

Typically, the protective sheath 2 is a thermoplastic material or urethane acrylate. Other suitable materials for the protective sheath 2 include polybutylene terephthalate (PBT), nucleated polybutylene terephthalate, low-shrinkage polybutylene terephthalate, polyamide 12 (PA12), amorphous polyamide 12, polyamide 11 (PA11), polyvinyl chloride (PVC), nylon, polyethylene (PE), a halogen-free flame retardant (HFFR) material, a urethane polymer and/or polyester.

The optical fiber 3 typically includes a fiber core 31 for transmitting an optical signal, a cladding 32 surrounding the core 31 to confine the optical signal within the core 31, and a coating 33 surrounding the cladding 32 to protect the optical fiber 3. Typically, the coating 33 includes one or more layers of photo-cross-linked acrylate resins. The coating 33 may be colored to facilitate identifying individual optical fibers.

In some exemplary embodiments, the optical fiber 3 (i.e., the fiber core 31, cladding 32, and coating 33) has a standard diameter of about 250 microns (e.g., between about 235 and 265 microns). Typically, the buffered optical fiber 1 (i.e., including the optical fiber 3 and the protective sheath 2) has a standard diameter of about 900 microns. As will be understood by those of ordinary skill in the art, the recited standard diameters are merely exemplary, and the buffered optical fiber 1 and the optical fiber 3 of the present invention may have different dimensions.

Typically, at least one mechanical reinforcement member 4 (e.g., a mechanical reinforcing strand of aramid) is placed along the length of the optical fiber 3. In this regard, each mechanical reinforcement member 4 typically extends along the axis of the buffered optical fiber 1.

FIGS. 1 and 2 depict exemplary embodiments of a buffered optical fiber 1 having two mechanical reinforcement members 4. As shown, the optical fiber 3 and the mechanical reinforcement members 4 may be positioned in various arrangements. For example, in FIG. 1, the optical fiber 3 is arranged off-center within the cavity 21. By way of comparison, in FIG. 2, the mechanical reinforcement members 4 surround the optical fiber 3, which is centered in the cavity 21.

FIG. 3 depicts an exemplary embodiment of a buffered optical fiber 1 having only one mechanical reinforcement member 4, which surrounds the optical fiber 3 over much of its exterior surface (e.g., its circumferential surface or peripheral outline). In this regard, at a given cross-section of a buffered optical fiber 1 according to this exemplary embodiment, the mechanical reinforcement member(s) 4 will typically surround a large percentage of the optical fiber's outer circumference. Typically, the mechanical reinforcement member(s) 4 surround about 50 percent or more of the optical fiber's exterior surface. More typically, the mechanical reinforcement member(s) 4 surround more than 80 percent or more of the optical fiber's exterior surface.

As those having ordinary skill in the art will appreciate, the desired dimensions and performance of the buffered optical fiber 1 should be considered when selecting the size, shape, and material for the mechanical reinforcement member 4.

Typically, the diameter of the cavity 21 is selected such that the one or more mechanical reinforcement members 4 and the optical fiber 3 can be arranged to fit appropriately within the cavity 21. For example, in FIG. 3, the diameter of the cavity 21 is about 500 microns. In this regard, the optical fiber 3 is well supported in the cavity 21 and the buffered optical fiber 1 is relatively stable over the usual operating temperature range of −40° C. to +70° C.

A mechanical reinforcement member 4 arranged as depicted in FIG. 3 provides improved mechanical reinforcement along the axis of the buffered optical fiber 1 by increasing the overall modulus of elasticity of the buffered optical fiber 1.

In an exemplary embodiment, the mechanical reinforcement member 4 is made from a 400 decitex (dtex) aramid filament. In another exemplary embodiment, the mechanical reinforcement member 4 is made from a glass filament. Typically, the mechanical reinforcement member 4 is made from a material having mechanical strength comparable to that of a 400 dtex aramid filament.

When an operator extracts the buffered optical fiber 1 from the cable 10 (FIG. 4), the protective sheath 2 typically deforms only slightly for a given extraction force. In this regard, much longer lengths of buffered optical fiber 1 may be extracted from the cable 10. Moreover, the risk of damaging the optical fiber 3 during extraction is reduced.

In an exemplary embodiment, the buffered optical fiber 1 includes two mechanical reinforcement members 4 made of aramid positioned along the optical fiber 3. The two mechanical reinforcement members 4 may be made of 400 dtex filaments. As will be understood by those of ordinary skill in the art, the number, size, shape, and material of the mechanical reinforcement members 4 should be selected according to the desired dimensions and performance of the buffered optical fiber 1.

For example, one exemplary embodiment of a buffered optical fiber 1 having two aramid strands of 400 dtex has a maximum elongation of 0.5 percent when subjected to an extraction force of 25 N. By way of comparison, a conventional buffered optical fiber (i.e., one that does not have an aramid strand) subjected to an extraction force of only 8 N has an elongation of 0.5 percent.

Typically, the number, size, shape and material of the mechanical reinforcement members 4 is selected to ensure that the buffered optical fiber 1 has a maximum elongation of 0.5 percent for an extraction force of 25 N. For example, the buffered optical fiber 1 may include a single aramid strand, one or more glass strands, or strands of a material capable of providing mechanical reinforcement and having mechanical strength comparable to that of two aramid strands.

In an exemplary embodiment of the buffered optical fiber 1 having two mechanical reinforcement members 4 made of aramid strands, the aramid strands may be used for tearing the protective sheath 2.

Typically, the intermediate material 5 prevents the protective sheath 2 and the optical fiber 3 from contacting each other. Similarly, the intermediate material 5 typically prevents the protective sheath 2 and the mechanical reinforcement member (or members) 4 from contacting each other. In other words, the intermediate material 5 typically separates the protective sheath 2 from both the optical fiber 3 and the mechanical reinforcement member (or members) 4.

In this regard, the intermediate material 5 typically surrounds the assembly formed by the mechanical reinforcement member(s) 4 and the optical fiber 3. The intermediate material 5 at least partially fills—typically entirely fills—the space in the cavity 21 that is not occupied by the assembly formed by the mechanical reinforcement member(s) 4 and the optical fiber 3.

The intermediate material 5 is typically a thermoplastic peelable material (e.g., a seal-and-peel material). In some exemplary embodiments, the intermediate material 5 is a temporary protection material that can be removed without leaving any traces. Those having ordinary skill in the art will recognize that a peelable material is a material that generally does not stick to the coating of an optical fiber. Stated differently, the cohesive strength of a peelable material is higher than the adhesive strength between the peelable material and the coating of the optical fiber onto which the peelable material is applied. In this regard, the thermoplastic peelable material facilitates the removal of the buffer material. Typically, the intermediate material 5 hardly (i.e., slightly or barely) sticks or otherwise adheres to the mechanical reinforcement member(s) 4 or the optical fiber 3. More typically, the intermediate material 5 does not adhere to the mechanical reinforcement member(s) 4 or the optical fiber 3 in any significant way.

In making conventional buffered optical fibers, during extrusion the molten protective sheath tends to stick to the yarns, and the module cannot be easily stripped to access the optical fiber. In this regard, the intermediate material typically encapsulates the optical fiber and mechanical reinforcement members, so that the molten buffer material (e.g., a protective sheath) does not directly contact the optical fiber or the mechanical reinforcement members. Therefore, when a portion of buffer material is removed, the encapsulating intermediate material can be removed and the buffer material is free to slip over the optical fiber and the mechanical reinforcement members.

Those of ordinary skill in the art will recognize that it is within the scope of the present invention that, over the length of the buffered optical fiber, there may be one or more locations where the optical fiber contacts the buffer material (i.e., the protective sheath). In general, however, the buffered optical fiber of the present invention includes an intermediate material between the optical fiber and the buffer material and between the mechanical reinforcement members and the buffer material. For example, at what appears to be a contact point (for instance in FIG. 1), there may be a thin film of an intermediate material, perhaps as small as five microns or less.

In exemplary embodiments, the intermediate material 5 is a peelable hot-melt material. A hot-melt material is a material that becomes fluid when heated. The intermediate material 5 may be made from a thermoplastic gel, such as a thermoplastic gel based upon synthetic hydrocarbon polymers. An exemplary material of this family is sold by Henkel® Corporation under the trade name Macroplast CF 405. The intermediate material 5 typically maintains the consistency of a flexible gel over the entire ordinary utilization temperature range of about −40° C. to +70° C.

The intermediate material 5 typically has a softening temperature higher than +70° C. and a glass transition temperature lower than −40° C. For example, Macroplast CF 405 has a softening temperature of about +97° C. and a glass transition temperature of about −80° C.

The intermediate material 5 is typically flexible. In this regard, the flexibility of the intermediate material 5 can limit the mechanical stresses on the optical fiber 3, while ensuring good coupling between (i) the optical fiber's coating 33 and the protective sheath 2 and (ii) the mechanical reinforcement member(s) 4 and the protective sheath 2.

By way of example, the hardness of Macroplast CF 405 has been evaluated by a cone-penetration test using the measuring equipment specified in French standard NFT60-119, which is hereby incorporated by reference. For an application time of five seconds, the measured penetrations were 35 tenths of a millimeter (3.5 millimeters) at −40° C., 70 tenths of a millimeter (7.0 millimeters) at +20° C., and 140 tenths of a millimeter (14.0 millimeters) at +70° C. Those of ordinary skill in the art will recognize that these measurements indicate that the intermediate material 5 remains flexible over the entire utilization range of the buffered optical fiber 1.

The use of an intermediate material 5 may reduce or even eliminate lateral stresses on the optical fiber 3, which can give rise to microbends. Microbends can cause attenuation of the optical signal transmitted by the optical fiber 3.

Typically, the intermediate material 5 prevents the separation of the protective sheath 2 from damaging the coating 33 of the optical fiber 3.

In this regard, tests have been conducted at ambient temperature on an exemplary embodiment of a buffered optical fiber 1 that includes an intermediate material 5 made of Macroplast CF 405, a protective sheath 2 made of PA12, an optical fiber 3, and two aramid strands as mechanical reinforcement members 4. FIG. 1 depicts a buffered optical fiber 1 having a similar structure to that of the tested buffered optical fiber. The intermediate material 5 filled the entire space within the cavity 21 that was not occupied by the optical fiber 3 and the mechanical reinforcement members 4. Portions of the protective sheath 2 having a length of 100 millimeters were stripped, revealing that the coating 33 of the optical fiber 3 was undamaged. More than one meter of optical fiber 3 could be stripped in less than one minute. The protective sheath 2 properly separated over the utilization range of −40° C. to +70° C. because of the characteristics of the intermediate material 5 over this temperature range.

The optical fiber 3 of this exemplary embodiment is easily stripped because the intermediate material 5 can be peeled away from the coating 33 of the optical fiber 3. In particular, the intermediate material 5 can be peeled off by hand without leaving traces on the coating 33 of the optical fiber 3.

If a thermoplastic intermediate material 5 is used, the intermediate material 5 can typically be extruded with the protective sheath 2 in a single fabrication operation.

Typically, the intermediate material 5 is compatible with any material suitable for use as the protective sheath 2. In an exemplary embodiment, the intermediate material 5 is made of Macroplast CF 405 and the protective sheath 2 is made of PA12. These two materials (i.e., Macroplast CF 405 and PA12) are generally translucent, and the color of the coating 33 of the optical fiber 3 can be readily observed through the protective sheath 2.

FIG. 4 schematically depicts a cross-section of an exemplary cable 10 having a plurality of buffered optical fibers 1 according to the present invention. In some exemplary embodiments, the buffered optical fibers 1 are positioned loosely (e.g., freely) within the cable 10.

The cable 10 includes an outer cable sheath 11 defining a cable cavity 12 in which the buffered optical fibers 1 are housed. Typically, the cable 10 includes strength members 13 positioned within the wall of the outer cable sheath 11 to limit axial deformation of the cable 10 during the contraction and expansion that may occur when the cable is subjected to temperature variations. In this regard, the strength members 13 limit the deformation by compensating the compression or expansion forces induced by the outer cable sheath 11. The outer cable sheath 11 may be made of a polymer, typically a halogen-free flame-retardant (HFFR) material.

A buffered optical fiber 1 may be extracted from a cable 10 as follows: (i) a first cut is made in the outer cable sheath 11 along the cable 10 to create a first opening; (ii) the buffered optical fiber 1 is then cut through the first opening; (iii) a second cut is made in the outer cable sheath 11 further down the length of the cable 10 to create a second opening; and (iv) the now-cut buffered optical fiber 1 is then pulled out of the cable 10 through the second opening.

Cable filling ratios should be kept low enough that they do not inhibit this extraction process. The length of the buffered optical fiber 1 extracted from the cable 10 typically corresponds to the distance between the two cuts made in the outer cable sheath 11 of the cable 10.

An optical fiber 3 may be formed using a method that includes (i) drawing an optical fiber preform to form an optical fiber that includes a fiber core 31 and a cladding 32 surrounding the fiber core 31 and then (ii) applying a coating 33 that surrounds the cladding 32. The coating 33 may be made, for example, of a photo-curable acrylate resin.

After the coating 33 has been cross-linked (e.g., cured using a UV lamp), at least one mechanical reinforcement member(s) 4 is placed along the optical fiber 3. An intermediate material 5 (e.g., a peelable intermediate material) is then extruded around the assembly formed by the optical fiber 3 and the mechanical reinforcement member(s) 4. A protective sheath 2 may then be extruded around the intermediate material 5. In one exemplary embodiment, the intermediate material 5 and the protective sheath 2 are extruded in a single fabrication operation. Typically, the intermediate material 5 does not need to be cross-linked (e.g., by passing the material under a UV lamp).

In exemplary embodiments including a peelable hot-melt material as the intermediate material 5, applying the intermediate material 5 and the protective sheath 2 can be performed at a temperature of between about 130° C. and 160° C. (e.g., about 140° C.). Typically, no additional drying or curing step is needed.

The present invention is not limited to the foregoing exemplary embodiments. For example, it is within the scope of the present invention to employ an optical fiber in combination with a polychromatic source, such as light-emitting diodes (LEDs).

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. patent application Ser. No. 12/489,995 for a Wavelength Multiplexed Optical System with Multimode Optical Fibers, filed Jun. 23, 2009, (Lumineau et al.); U.S. patent application Ser. No. 12/498,439 for a Multimode Optical Fibers, filed Jul. 7, 2009, (Gholami et al.); U.S. patent application Ser. No. 12/614,011 for a Reduced-Diameter Optical Fiber, filed Nov. 6, 2009, (Overton); U.S. patent application Ser. No. 12/614,172 for a Multimode Optical System, filed Nov. 6, 2009, (Gholami et al.); U.S. patent application Ser. No. 12/617,316 for an Amplifying Optical Fiber and Method of Manufacturing, filed Nov. 12, 2009, (Pastouret et al.); U.S. patent application Ser. No. 12/629,495 for an Amplifying Optical Fiber and Production Method, filed Dec. 2, 2009, (Pastouret et al.); and U.S. patent application Ser. No. 12/633,229 for an Ionizing Radiation-Resistant Optical Fiber Amplifier, filed Dec. 8, 2009, (Regnier et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,570,852 for an Optical Fiber Cable Suited for Blown Installation or Pushing Installation in Microducts of Small Diameter (Nothofer et al.); U.S. Patent Application Publication No. US 2008/0037942 A1 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Patent Application Publication No. US2009/0003781 A1 for an Optical Fiber Cable Having a Deformable Coupling Element (Parris et al.); U.S. Patent Application Publication No. US2009/0003779 A1 for an Optical Fiber Cable Having Raised Coupling Supports (Parris); U.S. Patent Application Publication No. US2009/0003785 A1 for a Coupling Composition for Optical Fiber Cables (Parris et al.); U.S. Patent Application Publication No. US2009/0214167 A1 for a Buffer Tube with Hollow Channels, (Lookadoo et al.); U.S. patent application Ser. No. 12/466,965 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. patent application Ser. No. 12/557,055 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Louie et al.); U.S. patent application Ser. No. 12/558,390 for a Buffer Tubes for Mid-Span Storage, filed Sep. 11, 2009, (Barker); U.S. patent application Ser. No. 12/614,692 for Single-Fiber Drop Cables for MDU Deployments, filed Nov. 9, 2009, (Overton); U.S. patent application Ser. No. 12/614,754 for Optical-Fiber Loose Tube Cables, filed Nov. 9, 2009, (Overton); U.S. patent application Ser. No. 12/615,003 for a Reduced-Size Flat Drop Cable, filed Nov. 9, 2009, (Overton et al.); U.S. patent application Ser. No. 12/615,106 for ADSS Cables with High-Performance Optical Fiber, filed Nov. 9, 2009, (Overton); U.S. patent application Ser. No. 12/615,698 for Reduced-Diameter Ribbon Cables with High-Performance Optical Fiber, filed Nov. 10, 2009, (Overton); and U.S. patent application Ser. No. 12/615,737 for a Reduced-Diameter, Easy-Access Loose Tube Cable, filed Nov. 10, 2009, (Overton).

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. A buffered optical fiber structure, comprising:
    a protective sheath defining a cavity;
    at least one optical fiber positioned within said protective sheath's cavity;
    at least one mechanical reinforcement member acentrally positioned within said protective sheath's cavity, said at least one mechanical reinforcement member extending along said at least one optical fiber; and
    a peelable thermoplastic material positioned within said protective sheath's cavity, said peelable thermoplastic material contacting said protective sheath and surrounding said at least one optical fiber and said at least one mechanical reinforcement member;
    wherein said thermoplastic material possesses the consistency of a flexible gel over a temperature range of −40° C. to +70° C., said thermoplastic material possessing a softening temperature higher than +70° C. and a glass transition temperature below −40° C.

2. A buffered optical fiber structure according to claim 1, wherein said thermoplastic material does not adhere to said at least one optical fiber or to said at least one mechanical reinforcement member in any significant way.

3. A buffered optical fiber structure according to claim 1, wherein the buffered optical fiber has a maximum elongation of 0.5 percent for an extraction force of 25 N.

4. A buffered optical fiber structure according to claim 1, including exactly two mechanical reinforcement members and exactly one optical fiber.

5. A buffered optical fiber structure according to claim 1, comprising two or more optical fibers.

6. A buffered optical fiber structure according to claim 1, wherein said at least one mechanical reinforcement member surrounds 50 percent or more of the exterior surface of at least one said optical fiber.

7. A buffered optical fiber structure according to claim 1, wherein said at least one mechanical reinforcement member surrounds 80 percent or more of the exterior surface of at least one said optical fiber.

8. A buffered optical fiber structure according to claim 1, wherein at least one said mechanical reinforcement member comprises aramid.

9. A buffered optical fiber structure according to claim 1, wherein said thermoplastic material comprises a hot melt material.

10. A buffered optical fiber structure according to claim 1, wherein said thermoplastic material comprises synthetic hydrocarbon polymers.

11. A buffered optical fiber structure according to claim 1, wherein said protective sheath comprises polybutylene terephthalate, nucleated polybutylene terephthalate, low shrinkage polybutylene terephthalate, polyamide 12, amorphous polyamide 12, polyamide 11, polyvinyl chloride, nylon, polyethylene, a halogen-free flame retardant material, a urethane polymer, and/or polyester.

12. A cable comprising one or more buffered optical fiber structures according to claim 1.

13. A buffered optical fiber structure, comprising:
    a protective sheath defining a cavity;
    at least one optical fiber positioned within said protective sheath's cavity;
    at least one mechanical reinforcement member acentrally positioned within said protective sheath's cavity, said at least one mechanical reinforcement member extending along said at least one optical fiber; and
    a peelable thermoplastic material positioned within said protective sheath's cavity, said peelable thermoplastic material contacting said protective sheath and surrounding said at least one optical fiber and said at least one mechanical reinforcement member;
    wherein said thermoplastic material possesses the consistency of a flexible gel over a temperature range of −40° C. to +70° C., said thermoplastic material possessing a softening temperature higher than +70° C. and a glass transition temperature below −40° C.;
    wherein said thermoplastic material does not adhere to said at least one optical fiber or to said at least one mechanical reinforcement member in any significant way; and
    wherein the buffered optical fiber has a maximum elongation of 0.5 percent for an extraction force of 25 N.

14. A buffered optical fiber structure according to claim 13, including exactly two mechanical reinforcement members and exactly one optical fiber.

15. A buffered optical fiber structure according to claim 13, comprising two or more optical fibers.

16. A buffered optical fiber structure according to claim 15, wherein said at least one mechanical reinforcement member surrounds 50 percent or more of the exterior surface of at least one said optical fiber.

17. A buffered optical fiber structure according to claim 13, wherein said at least one mechanical reinforcement member surrounds 80 percent or more of the exterior surface of at least one said optical fiber.

18. A buffered optical fiber structure according to claim 13, wherein at least one said mechanical reinforcement member comprises aramid.

19. A buffered optical fiber structure according to claim 13, wherein said thermoplastic material comprises a hot melt material.

20. A buffered optical fiber structure according to claim 13, wherein said thermoplastic material comprises synthetic hydrocarbon polymers.

21. A buffered optical fiber structure according to claim 1, wherein said protective sheath comprises polybutylene terephthalate, nucleated polybutylene terephthalate, low shrinkage polybutylene terephthalate, polyamide 12, amorphous polyamide 12, polyamide 11, polyvinyl chloride, nylon, polyethylene, a halogen-free flame retardant material, a urethane polymer, and/or polyester.

22. A cable comprising one or more buffered optical fiber structures according to claim 13.

* * * * *